(12) United States Patent
Brogly et al.

(10) Patent No.: US 6,685,258 B2
(45) Date of Patent: Feb. 3, 2004

(54) VEHICLE SUBASSEMBLY INCLUDING A COOLING CASSETTE AND A SUPPORT FRAME

(75) Inventors: Sébastien Brogly, Saint Just (FR); Ghislain George, Vernon (FR); Thierry Renault, Vernon (FR)

(73) Assignee: Peguform France, Marcel (FR)

( * ) Notice: Subject to any disclaimer, the term of this patent is extended or adjusted under 35 U.S.C. 154(b) by 0 days.

(21) Appl. No.: 09/952,516

(22) Filed: Sep. 13, 2001

(65) Prior Publication Data

US 2002/0043820 A1 Apr. 18, 2002

(30) Foreign Application Priority Data

Sep. 13, 2000 (FR) .............................. 00 11674

(51) Int. Cl.7 .............................................. B62D 25/08
(52) U.S. Cl. .............................. 296/203.02; 296/193.09
(58) Field of Search ........................... 296/203.02, 194, 296/193.09, 193.1

(56) References Cited

U.S. PATENT DOCUMENTS

| 5,358,304 A | * 10/1994 | Kanemitsu |
| 5,658,041 A | * 8/1997 | Girardot et al. |
| 6,186,583 B1 | * 2/2001 | Martin |
| 6,364,403 B1 | * 4/2002 | Ozawa et al. |
| 6,450,276 B1 | * 9/2002 | Latcau |

FOREIGN PATENT DOCUMENTS

| DE | 198 27 451 A1 | 1/1999 |
| EP | 0 908 374 A1 | 4/1999 |
| EP | 0 994 006 A1 | 4/2000 |

* cited by examiner

Primary Examiner—Joseph D. Pape
(74) Attorney, Agent, or Firm—Brooks Kushman P.C.

(57) ABSTRACT

A vehicle subassembly includes a cooling cassette provided with at least one cassette element and a frame provided with at least one frame element which cooperates with the cassette element to fix the cassette to the frame. A thrust force applied to a face of the cassette that faces toward the front when mounted in the vehicle causes the cassette element to separate from the frame element.

17 Claims, 1 Drawing Sheet

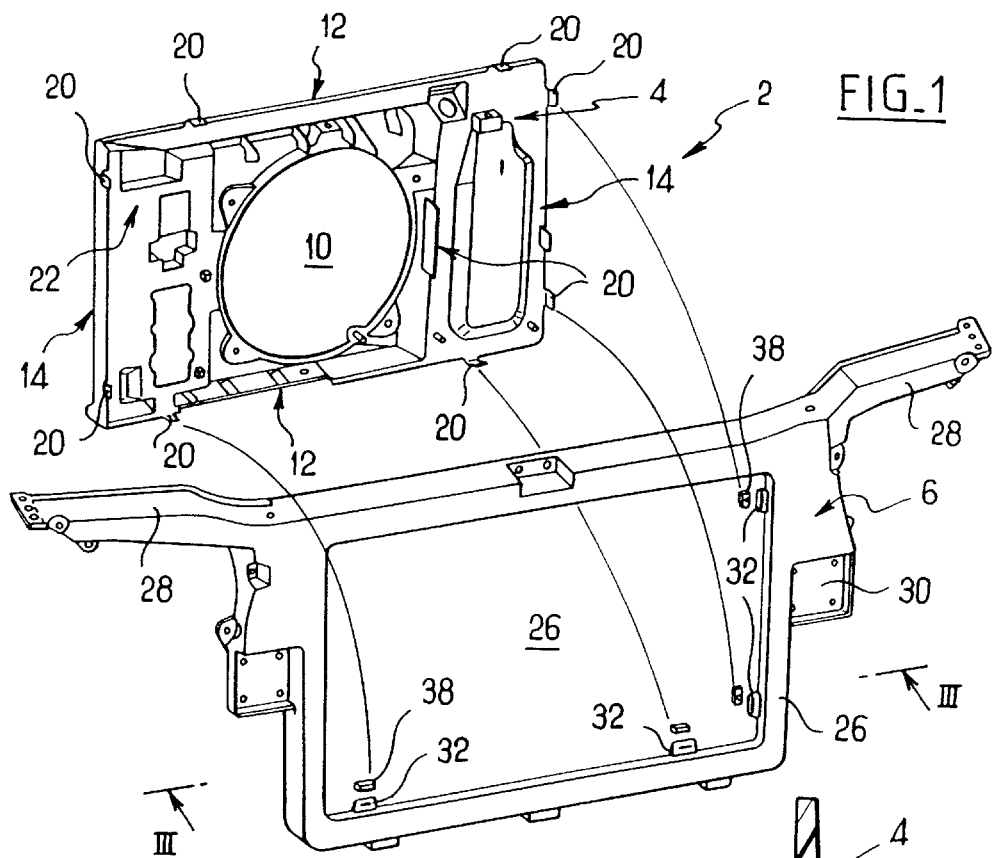
FIG_1
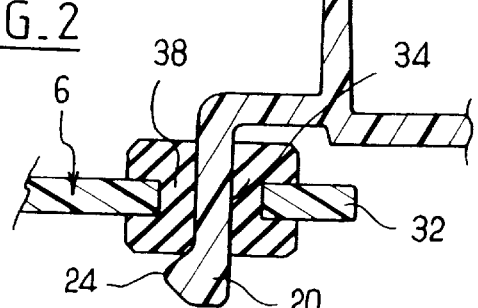
FIG_2
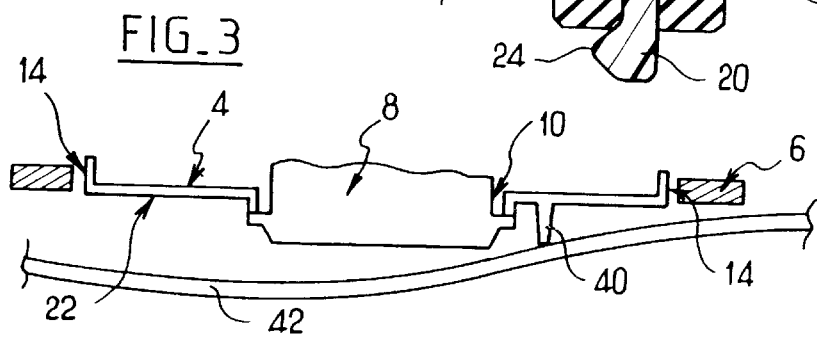
FIG_3

VEHICLE SUBASSEMBLY INCLUDING A COOLING CASSETTE AND A SUPPORT FRAME

BACKGROUND OF THE INVENTION

1. Field of the Invention

The invention relates to subassemblies for automobile vehicles including a cooling cassette and a support frame for the cassette.

2. Description of the Prior Art

Subassemblies for automobile vehicles including a cooling cassette supporting a motorized fan unit and a frame supporting the cassette are known in the art. The subassembly constitutes what is sometimes referred to as the technical front bulkhead of the vehicle. At present, the cassette is generally fixed to the frame by means of positive fasteners such as screws. This has drawbacks, however. If the vehicle suffers a frontal impact (such as a standard DANNER impact), causing pressure to be applied to the cooling cassette, the subassembly often fractures, damaging the cassette and the frame.

One object of the invention is to provide a subassembly of the above kind which improves the chances of the cassette and/or the frame remaining undamaged if the vehicle suffers a frontal impact.

SUMMARY OF THE INVENTION

To achieve the above object, the invention provides a vehicle subassembly including a cooling cassette provided with at least one cassette element and a frame provided with at least one frame element adapted to cooperate with the cassette element to fix the cassette to the frame, which elements are adapted so that a thrust force applied to a face of the cassette that faces toward the front when mounted in the vehicle causes the cassette element to separate from the frame element.

Accordingly, in many circumstances, if the impact applies a force toward the rear on the cassette, it separates the cassette from the frame without damaging either of them. It is therefore possible either to refit the cassette to the frame or to replace only the cassette or only the frame with an identical component.

The subassembly according to the invention can further have at least one of the following features:

- it includes an elastomer stud adapted to be interposed between the cassette element and the frame element;
- the cassette element is adapted to come into contact with the frame element to fix the cassette to the frame;
- one of the two elements of the pair consisting of the cassette element and the frame element is conformed as a male part and the other element of that pair is conformed as a female part adapted to receive the male part;
- the cassette element is conformed as a male part;
- one of the two elements of the pair consisting of the cassette element and the frame element is conformed as a lug and the other element of that pair is conformed to retain the lug with a clipping action;
- the cassette element is conformed as a lug;
- it includes a rib projecting from the face of the cassette that faces toward the front when mounted in the vehicle;
- it includes a motorized fan unit fixed to the cassette, the cassette having a raised portion projecting from the face of the cassette that faces toward the front when mounted in the vehicle and projecting farther toward the front than the motorized fan unit.

The invention also provides a vehicle including a cooling cassette provided with at least one cassette element and a frame provided with at least one frame element cooperating with the cassette element to fix the cassette to the frame, which elements are adapted so that a thrust force applied to a face of the cassette that faces toward the front when mounted in the vehicle causes the cassette element to separate from the frame element.

Other features and advantages of the invention will become more apparent in the course of the following description of a preferred embodiment, which description is given by way of non-limiting example and with reference to the accompanying drawing.

BRIEF DESCRIPTION OF THE DRAWING

FIG. 1 is an exploded perspective view of a preferred embodiment of a subassembly in accordance with the invention without the motorized fan unit.

FIG. 2 is a view in cross section of the frame and the cassette of the subassembly shown in FIG. 1, at the location of a pair of fasteners.

FIG. 3 is a view in horizontal section of the subassembly shown in FIG. 1 taken along the line III—III.

DETAILED DESCRIPTION OF THE PREFERRED EMBODIMENT

FIGS. 1 to 3 show a preferred embodiment of a subassembly in accordance with the invention.

The subassembly 2 comprises a cooling cassette 4, a support frame 6 and a motorized fan unit 8.

The cassette 4 is thin and generally rectangular. It has in the vicinity of its center a circular opening 10 adapted to receive the motorized fan unit 8. The cassette 4 also has various raised and recessed portions adapted to receive items that are known in the art and that are not described in detail here. The cassette 4 is vertical when fixed to the vehicle. In this position, the longitudinal sides 12 of the rectangle are horizontal and transverse to the direction of movement of the vehicle. The short sides 14 of the rectangle are vertical.

The cassette has lugs 20, of which there are eight in this example, for fixing it to the frame 6. Each of the four edges 12, 14 of the cassette carries two of the eight lugs. The lugs extend from the edge of the cassette toward the front, projecting from the face 22 of the cassette that faces toward the front when fixed to the vehicle. Each lug has a generally flat shape and is essentially parallel to the edge that carries it. It also has a boss 24 on one side of the lug, near its free end, for retaining the lug in a fixing orifice described below.

The frame 6 includes a generally rectangular housing 26 which receives the cassette 4. The frame also has two horizontal longitudinal sides and two vertical short sides. The top left-hand and right-hand corners of the frame are extended laterally by two extensions 28. The ends of the extensions 28 are adapted to be fixed to the inner wings of the vehicle. Also, the frame 26 has half way up its vertical sides locations 30 for fixing the frame to two longitudinal members of the vehicle.

The frame includes the same number of tabs 32 as there are lugs 20, extending from the four sides of the frame into the opening intended to receive the cassette. Each tab 32 is vertical and has a generally flat shape with a rectangular contour. It has an orifice 34 at its center. In this example, the orifice is occupied by an elastomer material stud or shoe 38 having an opening at its center and an annular groove at its periphery adapted to envelop the edges of the opening 34 in the tab to receive and locate the shoe in the opening. The opening 34 in each tab 32 and the central opening in the corresponding shoe are elongate. The opening is adapted to receive one of the lugs 20. The lugs 20 therefore constitute male parts and the tabs 32 constitute respective female parts which receive them from behind. Consequently, the cassette 4 is mounted on the frame 6 by inserting it into the opening 26 of the frame from behind.

When the cassette is correctly positioned in the opening, the eight lugs 20 are engaged in the openings 8 in the shoes and are received in the respective tabs. When the lugs are inserted into the shoes 38, the boss 24 of each lug defines a sticking point that has to be overcome before the lug is properly received in the tab. This sticking point limits the risk of unintentional withdrawal of the lug from the tab on rearward movement of the cassette out of the frame. The lugs are retained firmly in the tabs by the compression force applied to the lugs by the elastomer material shoes. Also, the bosses 24 on the lugs have an additional retaining effect. The cassette is therefore properly fixed into the frame that supports it.

The cassette 4 carries the motorized fan unit 8, which is received in its opening 10, as shown in FIG. 3. The cassette has a raised portion 40, which takes the form of a vertical rib in this example, projecting from the face 22 of the cassette that faces toward the front when fitted to the vehicle. The rib extends farther toward the front than the motorized fan unit 8. Accordingly, if the vehicle suffers a frontal impact, for example at a low speed, generating temporary or permanent deformation of the bumper beam 42, in many circumstances the bumper beam 42 will strike the rib 40 on the cassette before reaching the motorized fan unit. This impact causes the cassette to move toward the rear relative to the frame, extracting the lugs from the tabs. The impact therefore causes localized or total demounting of the cassette from the frame. In many cases neither the cassette nor the frame will be damaged. In particular, the fastenings formed by the lugs and the tabs are protected from any damage. It is therefore possible either to refit the cassette directly to the frame or to replace either the cassette or the frame with a new component. This reduces the cost of repair.

Moreover, the subassembly in accordance with the invention facilitates standardizing the fixing of the cooling cassettes to the frames.

The function of the shoes 38 is essentially to damp vibration. In a different embodiment, these shoes could be dispensed with and the lugs clipped directly into the tabs by virtue of the bosses 24 and the ends of the lugs coming into elastic bearing engagement against an edge of the orifice in each tab.

The invention is particularly suitable for the circumstances of the kind of impact usually referred to as DANNER impact.

Of course, many modifications can be made to the invention without departing from the scope of the invention.

There is claimed:

1. A vehicle subassembly including a cooling cassette provided with at least one cassette element and a frame provided with at least one frame element adapted to cooperate with said cassette element to removably mount said cassette to said frame, wherein said elements are adapted so that a predetermined thrust force applied to a face of said cassette that faces toward the front when mounted in said vehicle causes said cassette element to separate from said frame element without damage to at least one of the cassette or the frame.

2. The subassembly claimed in claim 1, including an elastomer stud adapted to be interposed between said cassette element and said frame element.

3. The subassembly claimed in claim 1, wherein said cassette element is adapted to come into contact with said frame element to fix said cassette to said frame.

4. The subassembly claimed in claim 1, wherein one of the two elements of the pair consisting of said cassette element and said frame element is conformed as a male part and the other element of that pair is conformed as a female part adapted to receive said male part.

5. The subassembly claimed in claim 4, wherein said cassette element is conformed as the male part.

6. The subassembly claimed in claim 1, wherein one of the two elements of the pair consisting of said cassette element and said frame element is conformed as a lug and the other element of that pair is conformed to retain said lug with a clipping action.

7. The subassembly claimed in claim 6, wherein said cassette element is conformed as the lug.

8. The subassembly claimed in claim 1, including a rib projecting from the face of said cassette that faces toward the front when mounted in said vehicle.

9. The subassembly claimed in claim 1, including a motorized fan unit fixed to said cassette and projecting from the face of the cassette that faces toward the front when mounted in said vehicle, said cassette having a raised portion projecting from the face of said cassette that faces toward the front when mounted in said vehicle and projecting farther toward the front than said motorized fan unit.

10. The subassembly claimed in claim 1, wherein one of the two elements of the pair consisting of said cassette element and said frame element is conformed as a horizontal lug and the other element of that pair is a tab having a central opening to receive the lug.

11. The subassembly claimed in claim 10, wherein the lug further comprises a boss to limit unintentional withdrawal of the lug from the tab.

12. The subassembly claimed in claim 1, wherein the predetermined force corresponds to a standard DANNER impact.

13. The subassembly claimed in claim 1, wherein the cassette and the frame each comprise a plastic material.

14. A vehicle including a cooling cassette provided with at least one cassette element and a frame provided with at least one frame element cooperating with said cassette element to removably mount said cassette to said frame wherein said elements are adapted so that a predetermined thrust force applied to a face of said cassette that faces toward the front when mounted in said vehicle causes said cassette element to separate from said frame element without damage to at least one of the cassette or the frame.

15. A vehicle subassembly including a cooling cassette provided with at least one cassette element and a frame provided with at least one frame element adapted to cooperate with said cassette element to removably mount said cassette to said frame, wherein said elements are adapted so that a predetermined thrust force applied to a face of said cassette that faces toward the front when mounted in said vehicle causes said cassette element to separate from said frame element thereby performing localized or total demounting of the cassette from the frame.

16. A vehicle subassembly including a cooling cassette provided with at least one cassette element and a frame provided with at least one frame element adapted to cooperate with said cassette element to removably mount said cassette to said frame, wherein said elements are adapted so that a predetermined thrust force applied to a face of said cassette that faces toward the front when mounted in said vehicle causes said cassette element to separate from said frame element without damaging either of the cassette or the frame.

17. A vehicle subassembly including a cooling cassette provided with at least one cassette element and a frame provided with at least one frame element adapted to cooperate with said cassette element to removably mount said cassette to said frame with a clipping means, wherein said elements are adapted so that a predetermined thrust force applied to a face of said cassette that faces toward the front when mounted in said vehicle causes said cassette element to separate from said frame element without damage to at least one of the cassette or the frame.

* * * * *